(12) United States Patent
Ang et al.

(10) Patent No.: US 10,051,601 B2
(45) Date of Patent: Aug. 14, 2018

(54) FLEXIBLE PAGING AND ON-DEMAND PAGE INDICATOR

(71) Applicant: QUALCOMM Incorporated, San Diego, CA (US)

(72) Inventors: Peter Pui Lok Ang, San Diego, CA (US); Wei Zeng, San Diego, CA (US); Tingfang Ji, San Diego, CA (US); Gavin Bernard Horn, La Jolla, CA (US); Joseph Binamira Soriaga, San Diego, CA (US); Naga Bhushan, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 14/836,435

(22) Filed: Aug. 26, 2015

(65) Prior Publication Data
US 2016/0270027 A1 Sep. 15, 2016

Related U.S. Application Data

(60) Provisional application No. 62/133,381, filed on Mar. 15, 2015.

(51) Int. Cl.
*H04W 68/00* (2009.01)
*H04W 68/02* (2009.01)
(Continued)

(52) U.S. Cl.
CPC .......... *H04W 68/02* (2013.01); *H04W 68/00* (2013.01); *H04W 76/27* (2018.02)

(58) Field of Classification Search
CPC ... H04W 68/00; H04W 68/02; H04W 68/025; H04W 68/12; H04W 74/00; H04M 11/022; G08B 3/1008
(Continued)

(56) References Cited

U.S. PATENT DOCUMENTS 6,965,297 B1 11/2005 Sandahl
7,796,547 B2 9/2010 Etemad et al.
(Continued)

FOREIGN PATENT DOCUMENTS

WO WO-2014083723 A1 6/2014
WO WO-2014090294 A1 6/2014

OTHER PUBLICATIONS

International Search Report and Written Opinion—PCT/US2016/018061—ISA/EPO—dated Jun. 7, 2016.

*Primary Examiner* — Huy C Ho
(74) *Attorney, Agent, or Firm* — Qualcomm IP Dept.; James Hunt Yancey, Jr.

(57) ABSTRACT

Certain aspects of the present disclosure generally relate to techniques for on-demand paging. In one aspect, a method is provided for receiving a paging message by a mobile device. The method generally includes acquiring network time, determining, based on the network time or an internal timer, that the mobile device is within a paging window wherein the mobile device can receive a paging message, and sending an indication message, in response to the determination. The mobile device may receive a response to the indication message, the response indicating whether or not there is a paging message for the mobile device.

54 Claims, 10 Drawing Sheets

(51) Int. Cl.
*H04W 76/27* (2018.01)
*H04B 7/00* (2006.01)

(58) Field of Classification Search
USPC .......................................................... 455/458
See application file for complete search history.

(56) References Cited

U.S. PATENT DOCUMENTS

| | | | |
|---|---|---|---|
| 8,050,692 B2 | 11/2011 | Huang et al. | |
| 8,073,470 B1* | 12/2011 | Collins | H04W 68/00 |
| | | | 455/458 |
| 8,160,618 B2 | 4/2012 | Harris | |
| 8,185,138 B2 | 5/2012 | Chin et al. | |
| 2005/0201311 A1* | 9/2005 | Willey | H04W 68/00 |
| | | | 370/311 |
| 2009/0154385 A1* | 6/2009 | Makhija | H04W 52/0229 |
| | | | 370/311 |
| 2010/0246564 A1* | 9/2010 | Vrcelj | H04L 25/0212 |
| | | | 370/350 |
| 2013/0301501 A1 | 11/2013 | Olvera-Hernandez et al. | |

\* cited by examiner

FLEXIBLE PAGING AND ON-DEMAND PAGE INDICATOR

CROSS-REFERENCE TO RELATED APPLICATIONS

This application claims benefit of U.S. Provisional Patent Application Ser. No. 62/133,381, filed Mar. 15, 2015, which is herein incorporated by reference in its entirety.

BACKGROUND

Field of the Disclosure

Certain aspects of the present disclosure generally relate to methods and apparatus for performing on-demand paging, where a mobile device polls for paging messages.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Certain types of devices that perform machine-type communications (MTC), such as Internet-of-Everything (IoE) devices, may be powered down a majority of the time. For example, such devices may have sparse communications separated by long sleep cycles (e.g., waking up to receive or transmit data just a few times a day).

Current types of devices monitor for paging channels based on periodic "paging occasion", for which a device must be awake to receive a paging message indicating there is data targeting the device. Such a paging indicator occurs at exactly the assigned time slot. This stringent timing requirement may result in a number of inefficiencies, for example, with extra time and/or energy required to obtain frame-level and/or hyper-frame level sync, possibly requiring an extra wake up which consumes power. In general, such a paging scheme works against the concept of asynchronous non-orthogonal access that IoE devices might ideally use.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a mobile device in a network. The method generally includes acquiring network time, determining, based on the network time or an internal timer, that the mobile device is within a paging window wherein the mobile device can receive a paging message, and sending an indication message, in response to the determination.

Certain aspects of the present disclosure provide a method for paging a wireless device by a node in a network. The method generally includes receiving an indication message from the mobile device, indicating the mobile device is able to receive a paging message and providing, in response to the indication message, an indication of whether or not there is a paging message for the mobile device.

Certain aspects of the present disclosure provide a method for paging a wireless device by a node in a network. The method generally includes sending a paging message to a base station to be delivered to a mobile device and providing an indication of whether or not the paging message is to be delivered in response to an inquiry message from the mobile device.

Certain aspects of the present disclosure provide an apparatus for wireless communications by a mobile device in a network. The apparatus generally includes means for acquiring network time, determining, based on the network time or an internal timer, that the mobile device is within a paging window wherein the mobile device can receive a paging message, and means for sending an indication message, in response to the determination.

Certain aspects of the present disclosure provide an apparatus for paging a wireless device by a node in a network. The apparatus generally includes means for receiving an indication message from the mobile device, indicating the mobile device is able to receive a paging message and means for providing, in response to the indication message, an indication of whether or not there is a paging message for the mobile device.

Certain aspects of the present disclosure provide an apparatus for paging a wireless device by a node in a network. The apparatus generally includes means for sending a paging message to a base station to be delivered to a mobile device and means for providing an indication of whether or not the paging message is to be delivered in response to an inquiry message from the mobile device.

Certain aspects of the present disclosure provide an apparatus for wireless communications by a mobile device in a network. The apparatus generally includes at least one processor configured to acquire network time and determine, based on the network time or an internal timer, that the mobile device is within a paging window wherein the mobile device can receive a paging message, and a transmitter configured to send an indication message, in response to the determination.

Certain aspects of the present disclosure provide an apparatus for paging a wireless device by a node in a network. The apparatus generally includes a receiver configured to receive an indication message from the mobile device, indicating the mobile device is able to receive a paging message and at least one processor configured to provide, in response to the indication message, an indication of whether or not there is a paging message for the mobile device.

Certain aspects of the present disclosure provide an apparatus for paging a wireless device by a node in a network. The apparatus generally includes a transmitter configured to send a paging message to a base station to be delivered to a mobile device and at least one processor configured to provide an indication of whether or not the paging message is to be delivered in response to an inquiry message from the mobile device.

Certain aspects of the present disclosure provide a computer readable medium. The computer readable medium generally includes computer executable code stored thereon for: acquiring network time, determining, based on the network time or an internal timer, that the mobile device is within a paging window wherein the mobile device can receive a paging message, and sending an indication message, in response to the determination.

Certain aspects of the present disclosure provide a computer readable medium. The computer readable medium generally includes computer executable code stored thereon for: receiving an indication message from the mobile device, indicating the mobile device is able to receive a paging message and providing, in response to the indication message, an indication of whether or not there is a paging message for the mobile device.

Certain aspects of the present disclosure provide a computer readable medium. The computer readable medium generally includes computer executable code stored thereon for: sending a paging message to a base station to be delivered to a mobile device and providing an indication of whether or not the paging message is to be delivered in response to an inquiry message from the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
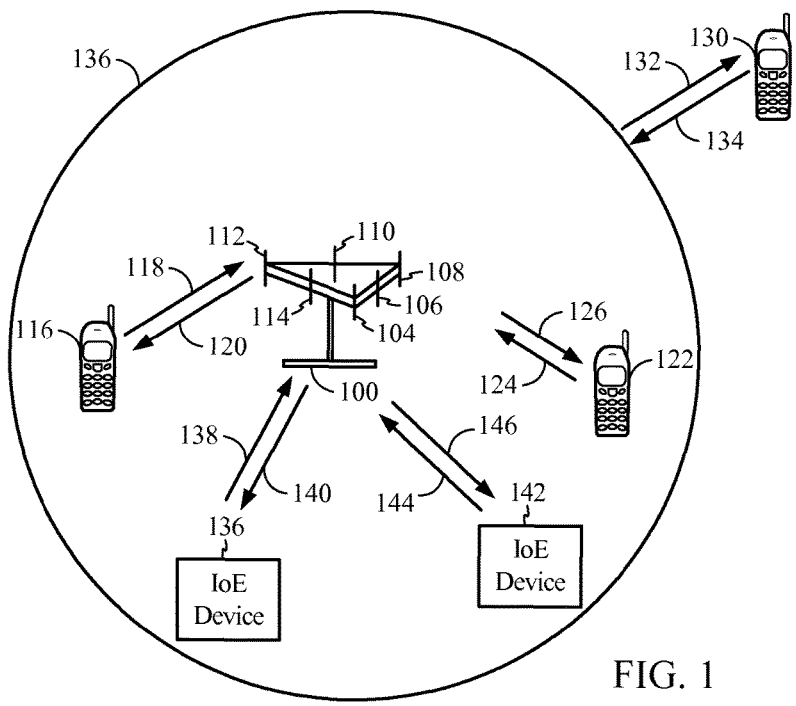
FIG. 1 illustrates an example multiple access wireless communication system, in accordance with certain aspects of the present disclosure.

Aspects of the present disclosure provide techniques that may provide for flexible paging of a mobile device and allow the mobile device to be paged "on-demand" rather than according to a strict adherence to periodic paging occasions. As a result, a mobile device with deep sleep cycles may be able to conserve power by avoiding one or more unnecessary wake-up cycles.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink (UL) communications where lower PAPR greatly benefits the mobile terminal in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some cases, an end device (e.g., in a mesh network) may behave similar to a UE, but it may communicate with another node which relays (or hops) to the bases station. Such devices may be referred to as a full-feature device (FDD) and or a personal area network (PAN) controller. In any case, such a node could also support the "network side" protocol of on-demand paging as described herein.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), an entertainment device (e.g., a music or video device, or a satellite radio), a vehicular component, a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates an example communications network in which aspects of the present disclosure may be performed. For example, techniques presented herein may be used to help facilitate sharing a common set of resources between various devices having different priority levels. In one aspect, an IOE device 136 may acquire network time and determine, based on the network time or an internal timer, that the IOE device 136 is within a paging window wherein the IOE device 136 can receive a paging message (e.g., from base station (BS) 100). The IOE device 136 may send an indication message (e.g., to the BS 100), in response to the determination.

Referring to FIG. 1, a multiple access wireless communication system according to one aspect is illustrated. The BS 100 may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Wireless node 116 may be in communication with antennas 112 and 114, where antennas 112 and 114 transmit information to wireless node 116 over forward link 120 and receive information from wireless node 116 over reverse link 118. Wireless node 122 may be in communication with antennas 106 and 108, where antennas 106 and 108 transmit information to wireless node 122 over forward link 126 and receive information from wireless node 122 over reverse link 124. The BS 100 may also be in communication with other wireless nodes, which may be, for example, Internet-of-Everything (IoE) devices. IoE device 136 may be in communication with one or more other antennas of BS 100, where the antennas transmit information to IoE device 136 over forward link 140 and receive information from IoE device 136 over reverse link 138. IoE device 142 may be in communication with one or more other antennas of BS 100, where the antennas transmit information to IoE device 142 over forward link 146 and receive information from IoE device 142 over reverse link 144. In a Frequency Division Duplex (FDD) system, communication links 118, 120, 124, 126, 138, 140, 144, and 146 may use different frequency for communication. For example, forward link 120 may use a different frequency than that used by reverse link 118, and forward link 140 may use a different frequency than that used by reverse link 138.

Each group of antennas and/or the area in which they are designed to communicate is often referred to as a sector of the BS. In one aspect of the present disclosure, each antenna group may be designed to communicate to wireless nodes in a sector of the areas covered by access point 100.

Wireless node 130 may be in communication with BS 100, where antennas from the BS 100 transmit information to wireless node 130 over forward link 132 and receive information from the wireless node 130 over reverse link 134.

In communication over forward links 120 and 126, the transmitting antennas of BS 100 may utilize beamforming in order to improve the signal-to-noise ratio of forward links for the different wireless nodes 116, 122, 136, and 142. In addition, a BS using beamforming to transmit to wireless nodes scattered randomly through its coverage causes less interference to access terminals in neighboring cells than a BS transmitting through a single antenna to all its wireless nodes.

Figure 2:
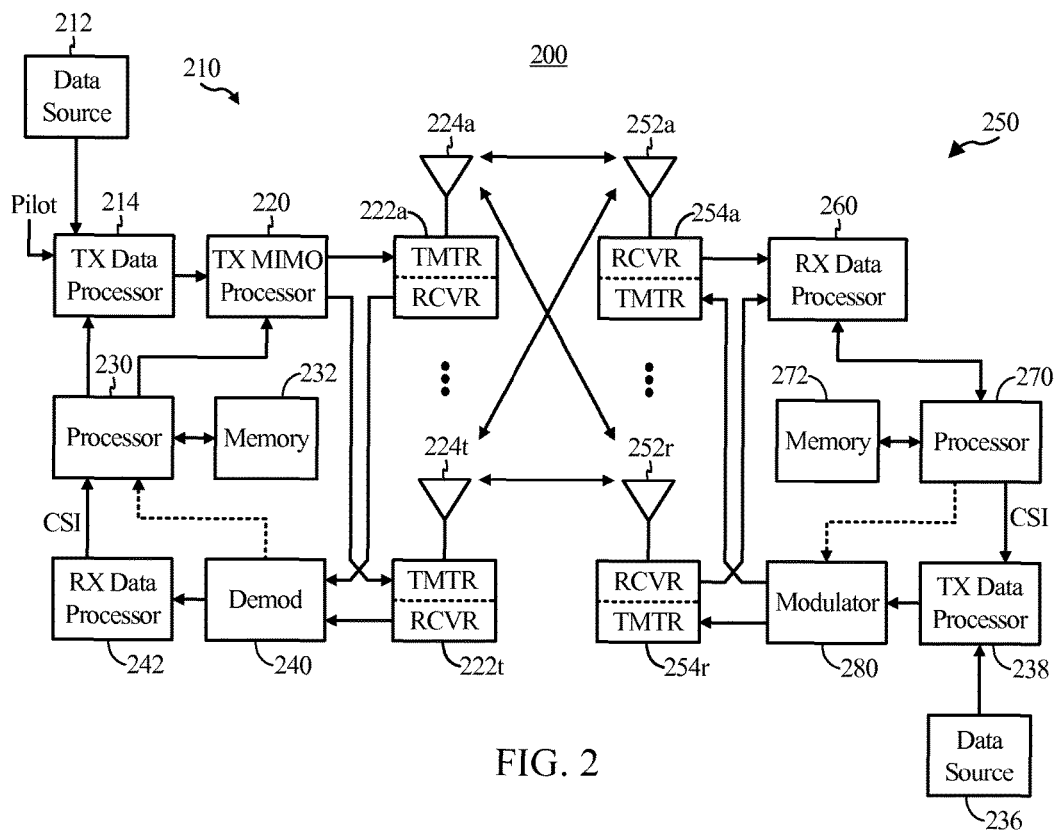
FIG. 2 illustrates a block diagram of a base station and a wireless node, in accordance with certain aspects of the present disclosure.

FIG. 2 illustrates a block diagram of an aspect of a transmitter system 210 (e.g., also known as the access point) and a receiver system 250 (e.g., also known as the access terminal) in a multiple-input multiple-output (MIMO) system 200. Each of system 210 and system 250 has capabilities to both transmit and receive. Whether system 210 or system 250 is transmitting, receiving, or transmitting and receiving simultaneously depends on the application. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software/firmware for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software/firmware for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Any one of the processor 270, RX data processor 260, TX data processor 238, or other processors/elements, or a combination thereof of the access terminal 250 and/or any one of the processor 230, TX MIMO processor 220, TX data processor 214, RX data processor 242, or other processors/elements, or a combination thereof of the access point 210 may be configured to perform the procedures for connectionless access in accordance with certain aspects of the present disclosure discussed below. In an aspect, at least one of the processor 270, RX data processor 260, and TX data processor 238 may be configured to execute algorithms stored in memory 272 for performing the random-access channel (RACH) procedures for connectionless access described herein. In another aspect, at least one of the processor 230, TX MIMO processor 220, TX data processor 214, and RX data processor 242 may be configured to execute algorithms stored in memory 232 for performing the RACH procedures for connectionless access described herein.

Figure 3:
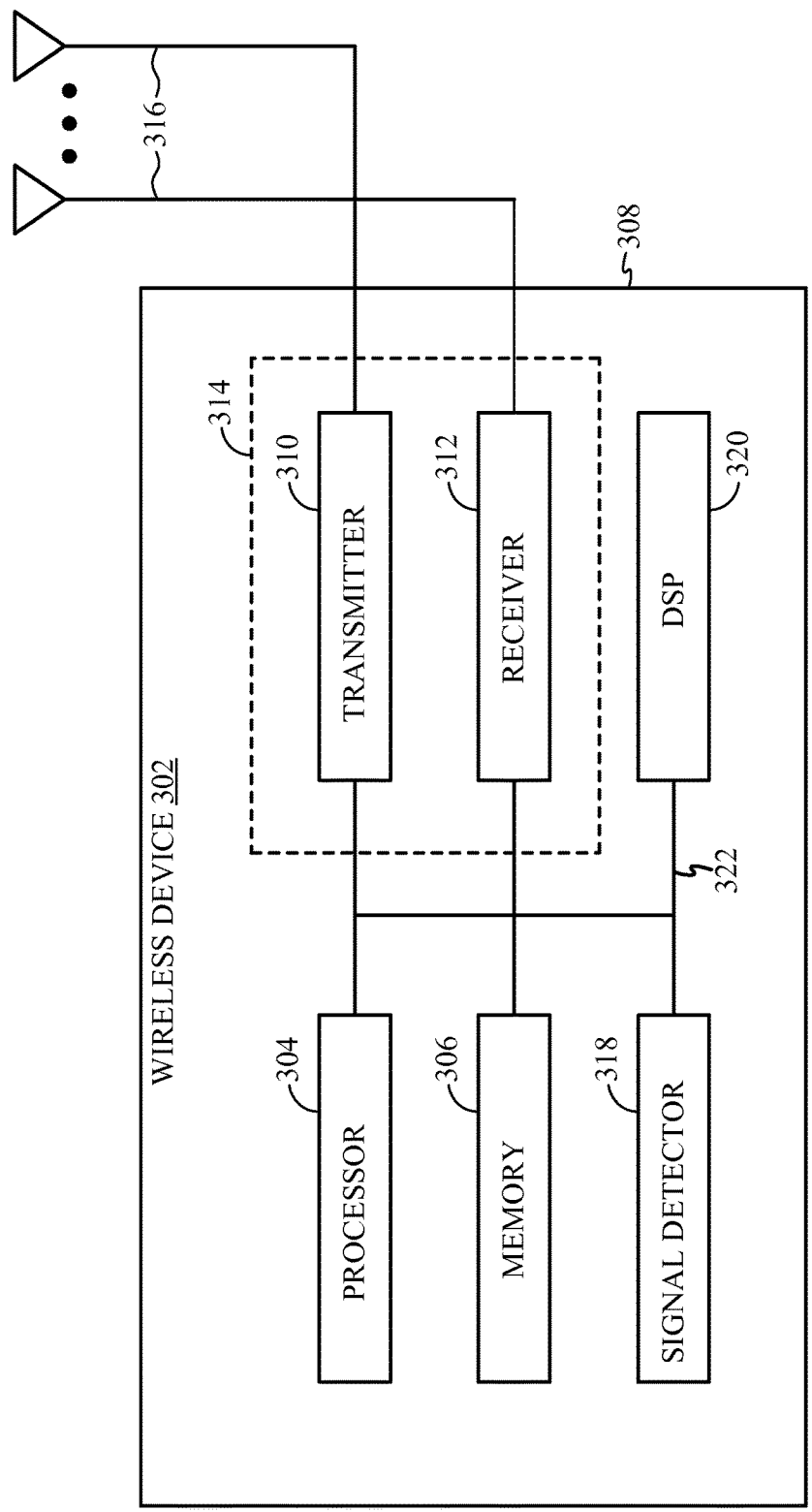
FIG. 3 illustrates various components that may be utilized in a wireless device, in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of the wireless nodes (e.g., 116, 122, 136, 142). For example, the wireless device 302 may be configured to perform operations 500 described in FIG. 5.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein, for example, to allow a UE to efficiently transmit data during a connectionless access.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus. The processor 304 may be configured to access instructions stored in the memory 306 to perform connectionless access, in accordance with aspects of the present disclosure discussed below.

Example Flexible Paging and on-Demand Page Indicator

As noted above, aspects of the present disclosure provide techniques for flexible paging of a mobile device that may allow the mobile device to be paged "on-demand." While the techniques are described with reference to on-demand paging, those skilled in the art will recognize that the techniques may be extended to on-demand delivery of other types of messages.

The techniques provided herein may be used to advantage for low power devices, such as Internet-of-Things (IoE) devices, that remain in low power states (e.g., long sleep cycles) much of the time and wake up only occasionally (e.g., just a few times a day) to send or receive data.

Such devices typically enter a "deep sleep" power saving state (during which transceivers are turned off) for extended periods of time. Devices typically reacquire synchronization to network time upon wake-up (e.g., referred to as a "cold start") due to device timing drift. The longer the deep sleep duration, the larger the timing drift may be.

Conventional cellular paging channel design is based on the concept of "paging occasion" (PO), which is assigned to a device (e.g., such as IoE device 136 or IoE device 142 illustrated in FIG. 1). The device is expected to detect a page during its PO (the cycle of PO is referred to as the paging cycle). There are various ways the detection could be done, for example, through a group paging indicator followed by UE ID identification (e.g., similar to long term evolution (LTE) systems), or dedicated paging indicator per UE for one-step detection (e.g. as done in 1× systems). There are variations to the exact paging mechanism. For example, in certain LTE discontinuous reception (DRX) systems, the maximum paging cycle is only 2.56 s. In certain systems (e.g., Release 12 LTE systems), for machine type communications (MTC), power saving mode (PSM) is introduced to allow use of tracking area update (TAU) timer to specify the time at which a user equipment (UE) should wake up and check for a page. This may facilitate a longer effective paging cycle.

Figure 4:
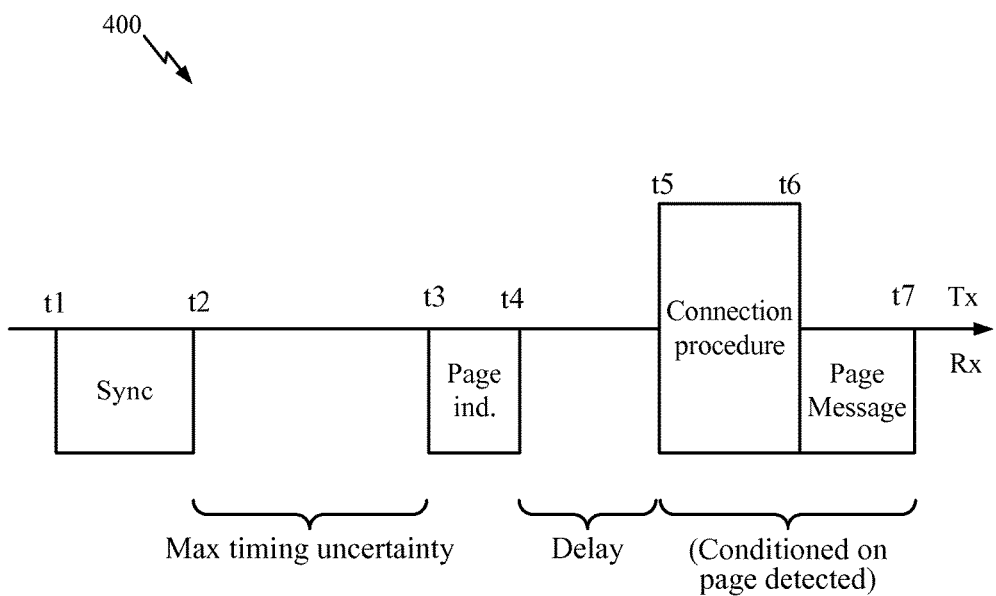
FIG. 4 is a transmission timeline illustrating an example paging scheme based on paging occasions (POs), in accordance with certain aspects of the present disclosure.

FIG. 4 is a transmission timeline 400 illustrating an example paging scheme based on paging occasions (POs), in accordance with certain aspects of the present disclosure. As illustrated in FIG. 4, if a device has been in deep sleep for sufficiently long time, the time drift could be significant and device may be programmed to wake up (e.g., at t1) much earlier than the assigned PO (e.g., occurring at t3) to synchronize with the network. In conventional schemes, frame-level timing or beyond (e.g. hyper-frame level timing) may be used in order to target the PO, which is typically on a grand time scale (e.g. once every 6 hours). In other words, the mobile device may remain awake to obtain a system frame number (SFN) via a broadcast message.

As illustrated in FIG. 4, there is often a significant time gap from the synchronization wake-up, at t1, until the PO at t3. Thus, it may be desirable for the device to enter or return to deep sleep, at t2, and target the next wake-up at t3 for the PO. If the time gap is not long enough, the device may remain active or enter a lighter sleep mode (e.g., at higher power level than deep sleep). There may be some energy overhead in transitioning in and out of sleep modes. During the second wake-up cycle (e.g., during times t3 to t4), the device performs page detection. If a page is detected, after some delay, the device may begin the connection procedure, at t5, to receive the message data (e.g., between times t6 and t7). If the delay before the message data is long enough, the device may enter sleep and target a third wake-up cycle (not shown) for the message data.

Despite the variations, in conventional designs, essentially the PO assignment is semi-static and UE is expected to be awake to detect for the page at the exact assigned time. Accordingly, techniques for flexible paging are desirable.

Aspects of the present disclosure provide a more flexible timeline for page detection, which may be particularly desirable for wide area network (WAN) IoE applications. Typically, mobile terminated (MT) data latency requirements are not stringent. For example, if a mobile device wakes up once every 6 hours to transmit or receive data (e.g., paging cycle of 6 hours), it may be acceptable, from the application point of view, if the wakeup is off by a few seconds or even minutes.

In some cases, mobile originated (MO) data may be delivered according to an asynchronous, non-orthogonal (e.g., with devices sharing a common resource pool) access scheme. In some cases, this type of scheme may avoid obtaining frame-level timing (which might require long latency to obtain a system frame number (SFN) that is broadcast only occasionally).

The present disclosure provides another scheme that may avoid obtaining frame-level synchronization for page detection. The flexible paging procedure described herein may eliminate one or more wake-up cycles. By relaxing a requirement on timing synchronization, in some cases, there may be no need for frame-level or beyond synchronization (e.g., no need to wait and obtain a broadcast SFN). As a result, paging cycles may be more dynamic and adaptive.

According to certain aspects, by relaxing the timing, a paging occasion may become a time vicinity instead of an exact time. As an example, if a paging cycle is 6 hours, the device could be allowed to check for a page within plus or minus x seconds of the actual PO. This window of time that the mobile device is allowed to receive and/or poll for paging messages is referred to herein as the "page window." In one example, this page window may be bigger than the worst case timing drift for the device for the duration of sleep.

Figure 5:
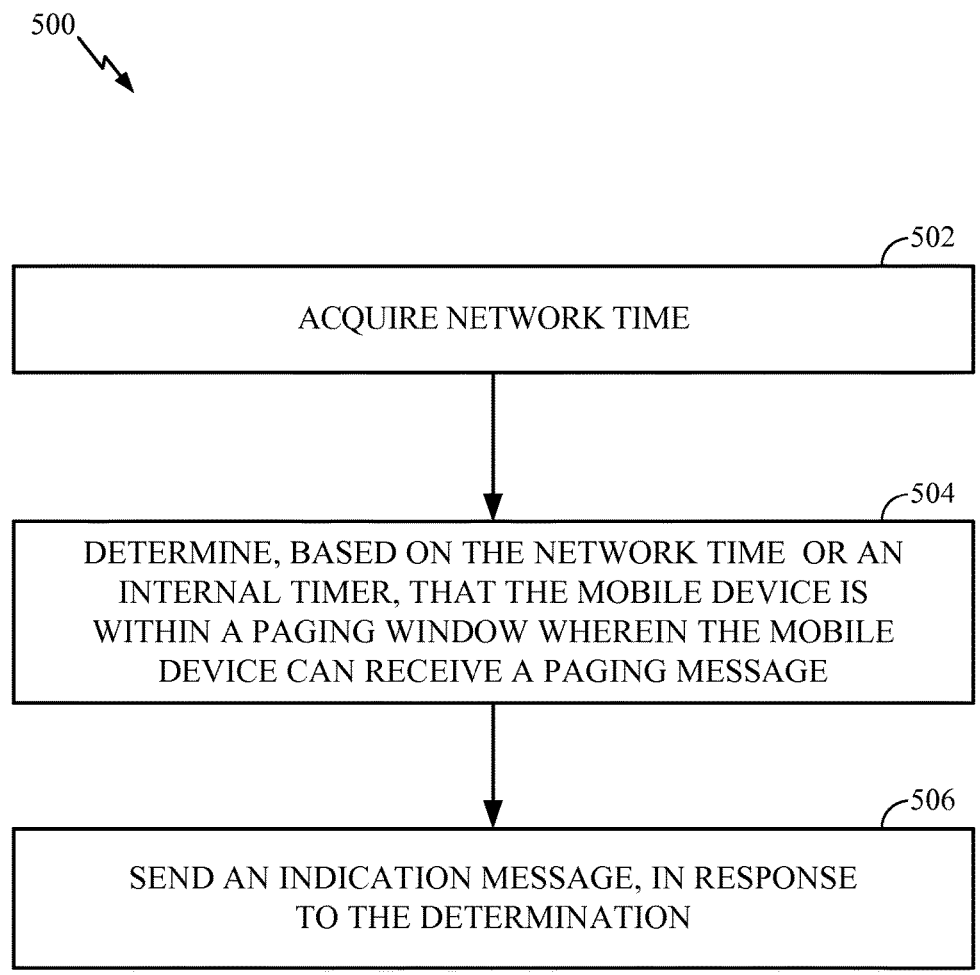
FIG. 5 illustrates example operations for on-demand paging by a mobile device, in accordance with certain aspects of the present disclosure.
Figure 6:
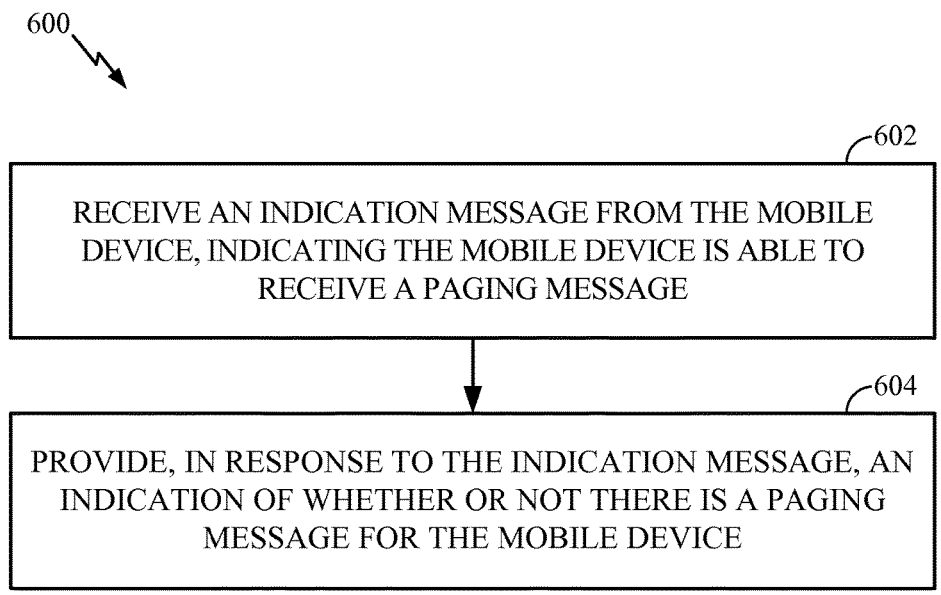
FIG. 6 illustrates example operations for on-demand paging of a mobile device by a network node, in accordance with certain aspects of the present disclosure.
Figure 7:
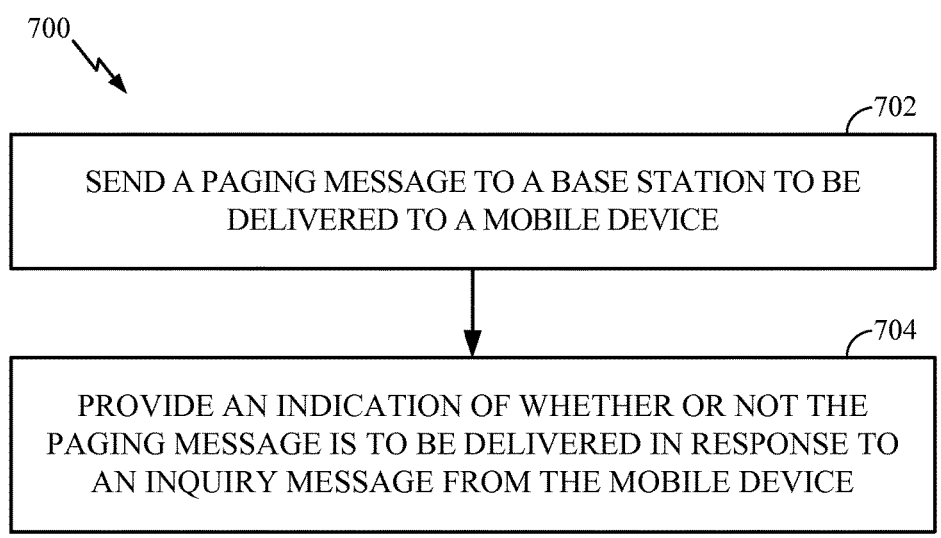
FIG. 7 illustrates example operations for on-demand paging of a mobile device by a network node, in accordance with certain aspects of the present disclosure.

FIGS. 5-7 illustrate example operations for on-demand paging from the perspective of a mobile device, a receiver (e.g., a base station) and a network node (e.g., a Mobility Management Entity (MME)), respectively.

FIG. 5 illustrates example operations 500 for on-demand paging, in accordance with certain aspects of the present disclosure. The operations 500 may be performed, for example, by a mobile device (e.g., IoE device 136 or 142). The operations 500 may begin, at 502, by acquiring network time. At 504, the mobile device may determine, based on the network time or an internal timer, that the mobile device is within a paging window wherein the mobile device can receive a paging message. At 506, the mobile device may send an indication message, in response to the determination.

FIG. 6 illustrates example operations 600 for on-demand paging of a mobile device, in accordance with certain aspects of the present disclosure. The operations 600 may be performed, for example, by a network node such as a base station (e.g., BS 100). The operations 600 begin, at 602, by receiving an indication message from the mobile device, indicating the mobile device is able to receive a paging message. At 604, the network node may provide, in response to the indication message, an indication of whether or not there is a paging message for the mobile device.

FIG. 7 illustrates example operations 700 for on-demand paging of a mobile device, in accordance with certain aspects of the present disclosure. The operations 700 may be performed, for example, by a network node (e.g., an MME). The operations 700 begin, at 702, by sending a paging message to a base station to be delivered to a mobile device. At 704, the network node may provide an indication of whether or not the paging message is to be delivered in response to an inquiry message from the mobile device.

Example Page Window

Figure 8:
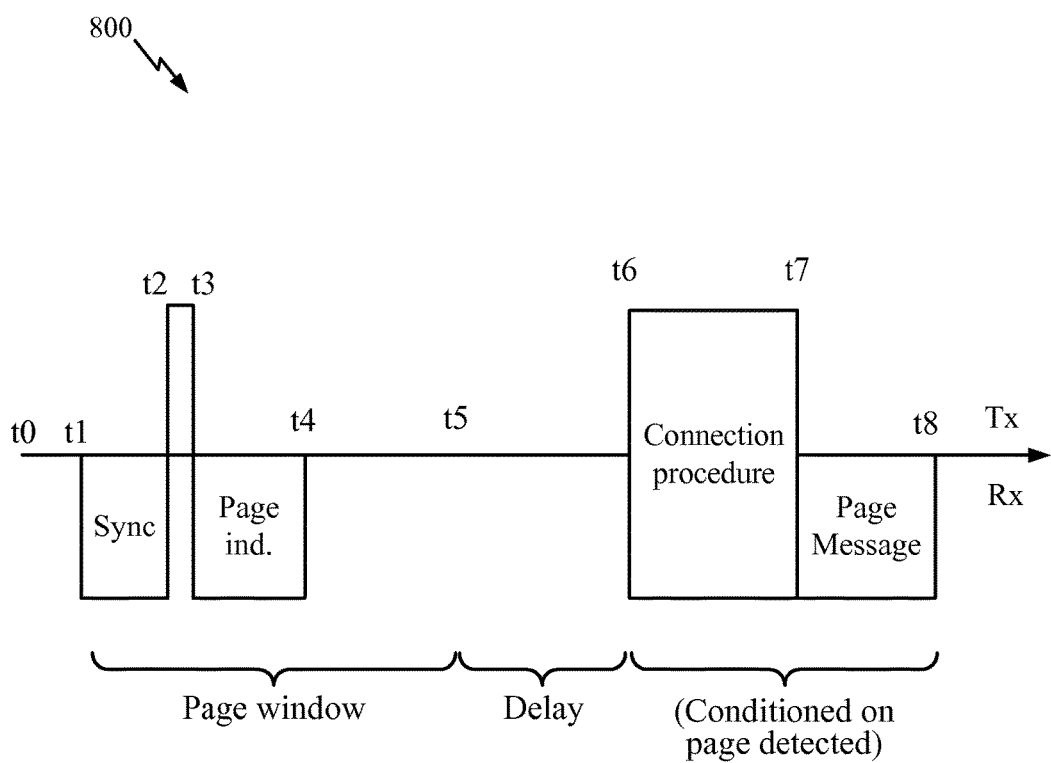
FIG. 8 is transmission timeline illustrating an example on-demand paging scheme, in accordance with certain aspects of the present disclosure.

FIG. 8 is transmission timeline 800 illustrating an example on-demand paging scheme, in accordance with certain aspects of the present disclosure. As illustrated in FIG. 8, instead of targeting much earlier than the PO (as done in the transmission timeline 400 illustrated in FIG. 4), the mobile device may target the PO. However, instead of targeting a specific time for the PO, the mobile device may target the page window (e.g., defined as plus or minus x seconds of the PO) which, for example, may be the time t1 to t5 as shown in FIG. 8. Thus, even with timing drift, the actual wake-up time can land somewhere within the page window. For example, the mobile device may wake-up at t1, obtain network timing (synchronization) and check for the page between t3 and t4.

According to certain aspects, during the synchronization, at t1, unlike a conventional paging scheme, the mobile device may only obtain symbol-level timing (which may be quicker than synchronizing to frame-level timing), sufficient to support asynchronous non-orthogonal access. As shown in FIG. 8, after obtaining the network timing, the mobile device may transmit a "page inquiry", at t2, or "indication message." According to certain aspects, the page inquiry/indication message may be aggregated with MO data. The receiver of the page inquiry/indication message (e.g., a base station), may respond, at t3, within some small latency, with a response or page indicator (PI) to the mobile device.

This response/page indicator could be carried on a DL resource that the mobile device is expected to be monitoring. For example, the mobile device may monitor a PDCCH resource, or a PDSCH resource allocated to the device through a DL grant. In some cases, a page indicator request could be a "Tx chirp" signal and the response could be a "chirp response" signal. In either cases, if a response page indicator (PI) shows no page, the mobile device may go back to deep sleep.

Alternatively, if the response indicates a page, the mobile device may wake-up a second time (e.g., at t6), after a delay (e.g., t5 to t6), to perform the connection procedure and receive the page message (e.g., at t7). Thus, the transmission timeline 800 may include only two wake-ups for the mobile device, which may increase energy efficiency.

If the delay is long enough, the mobile device may enter deep sleep and target for another wake-up cycle. In some cases, scheduling information for data associated with the paging message may be sent with the response, or even the data associated with the paging message itself may be sent.

Example Flexible Paging Cycle

A paging cycle may be driven by latency. For example, the mobile device may be "paged" for the arrival of mobile terminated (MT) data within the maximum tolerable latency, during which time the MT data is held in a buffer until sent. In a conventional scheme, a fixed paging cycle smaller than the maximum latency for MT data may ensure that the data arrives within the maximum tolerable latency.

According to certain aspects of the present disclosure, another way to ensure that the arrival of MT data within the maximum tolerable latency may be to use an on-demand page indication for a flexible paging cycle. For example, the mobile device may "inquire" the buffering entity (e.g., the base station), as long as the time period from the last inquiry is within the maximum tolerable latency. This approach may be more efficient if the device is already waking up periodically to send MO data and/or for some other reasons, and this periodicity is more frequent than the maximum latency for MT data.

In some WAN IoE use cases, the MT and MO cycles may be at similar time scales. In such cases, it may be more efficient to align the cycles. During the MO procedure, the mobile device may also perform page detection by inquiring for page indicator (PI). Such alignment of MO and MT wake-ups may result in energy saving. Alternatively, the device could also wake up and perform on-demand page detection without MO data (e.g., based on a timer or when waking up to perform other tasks).

Figure 9:
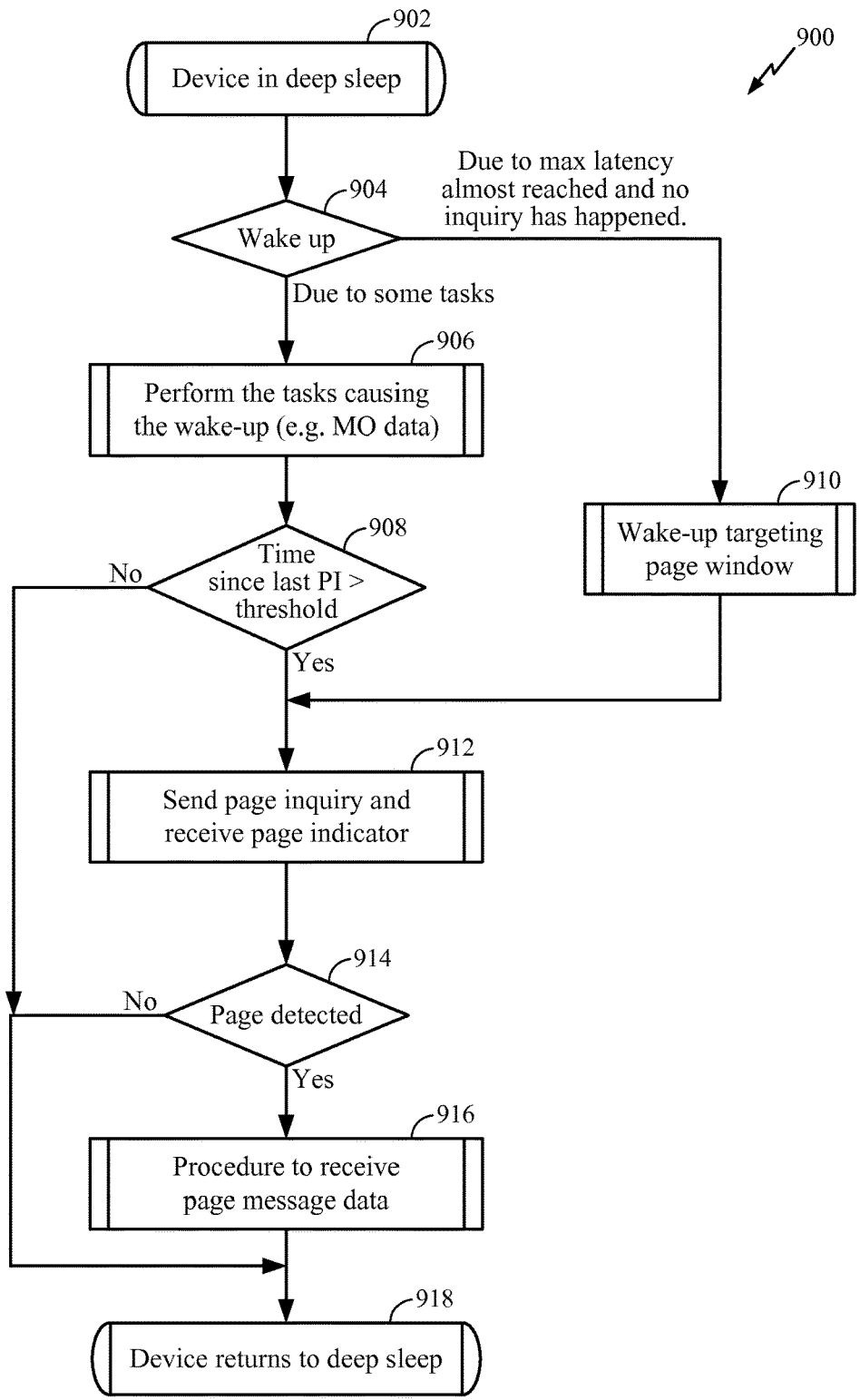
FIG. 9 illustrates an example flow diagram of on-demand paging by a mobile device, in accordance with certain aspects of the present disclosure.

FIG. 9 illustrates an example flow diagram 900 of on-demand paging by a mobile device, in accordance with certain aspects of the present disclosure. In an example implementation, to ensure the maximum tolerable latency is not exceeded, the mobile device may maintain a timer since the last time the mobile device inquired for a page. When the elapsed time reaches the maximum tolerable latency (or within some margin of the maximum tolerable latency), the mobile device may inquire for a page again.

As illustrated in FIG. 9, at 902, the mobile device may be in a deep sleep. At 904, the mobile device may wake up. If the mobile device wakes up to perform a task(s) (e.g., MO data to send), the mobile device may perform the task(s) at 906. At 908, the mobile device may determine (e.g., based on a timer started after sending the previous PI) whether the time since the last PI was sent is greater than a threshold (e.g., the maximum tolerable latency). If so, the mobile device may send a page inquiry, for example to the BS, and receive a page indicator. Alternatively, if the mobile device wakes up due to having not sent an inquiry in a period within some margin of the maximum tolerable latency, the mobile device may wake-up targeting a page window, at 910, and at 912 send the page inquiry and receive the page indicator. After sending the page inquiry and receiving the page indicator at 912, the mobile device may determine, at 914, if a page is detected. If page is detected, at 916, the mobile device may perform the procedure to receive page message data. At 918, after receiving the page message data, if a page is not detected at 914, or if at 908 the time since the last PI was sent is less than the threshold, the mobile device may return to deep sleep.

Figure 10:
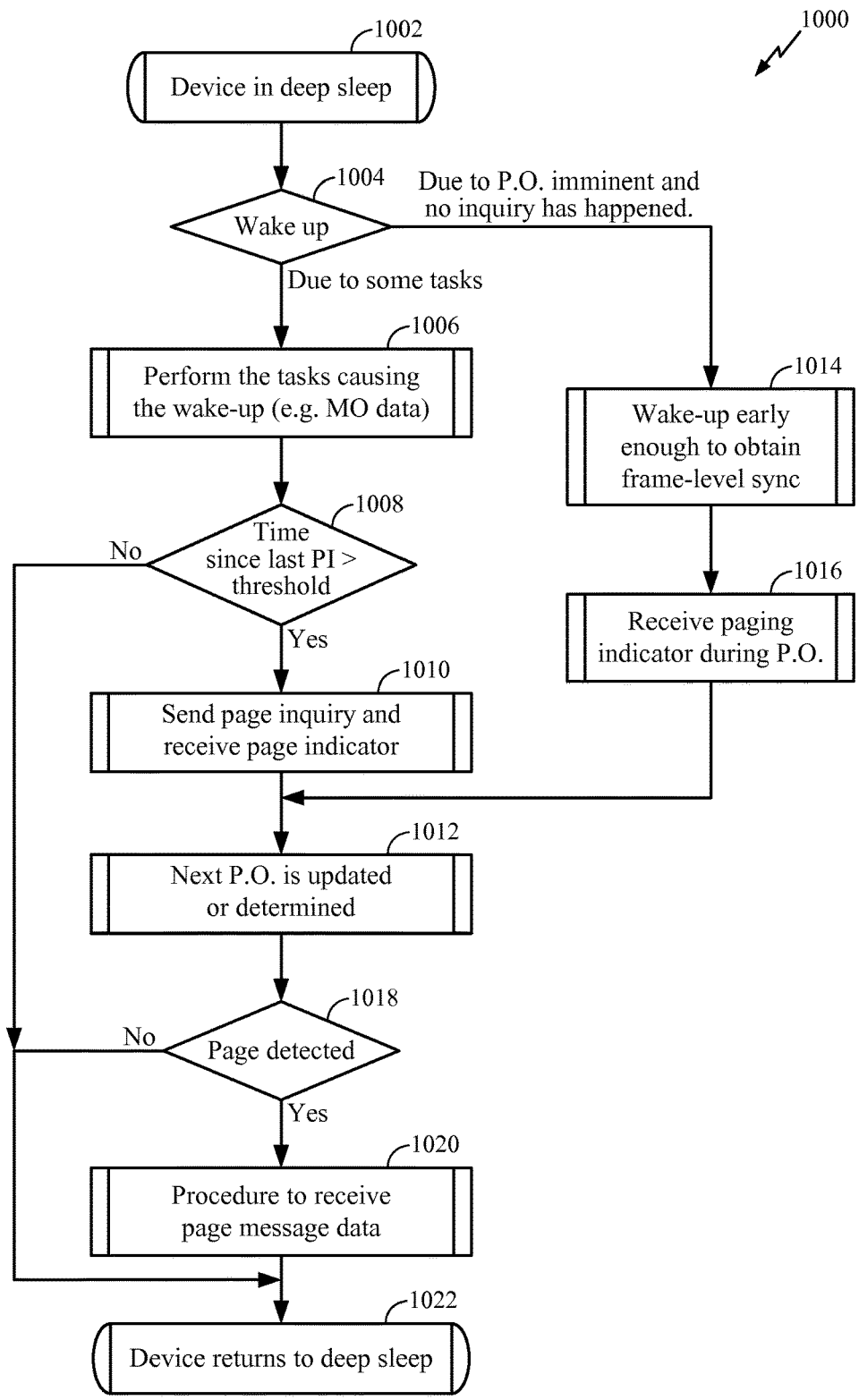
FIG. 10 is another example flow diagram illustrating on-demand paging by a mobile device, in accordance with certain aspects of the present disclosure.

FIG. 10 illustrates another example flow diagram 1000 of on-demand paging by a mobile device, in accordance with certain aspects of the present disclosure. In an example implementation (e.g., a "hybrid mode"), to ensure the maximum tolerable latency is not exceeded, when the mobile device inquires for the page, the next PO may be updated to a later paging cycle. Until the next PO, if the mobile device does not perform any inquiry, the mobile device wakes up for its page indicator at the next PO. According to certain aspects, to start off, the mobile device may have an initial PO and paging cycle. The next PO and the paging cycle may be determined in the current PO to facilitate a flexible dynamic/adaptive paging cycles.

As illustrated in FIG. 10, at 1002 the mobile device may be in a deep sleep. The mobile device may wake up at 1004. At 1006, the mobile device may perform the task that caused the mobile device to wake up (e.g., MO data). At 1008, the mobile device may determine whether the time elapsed since the last inquiry is greater than a threshold. Alternatively, if the wake up is due to an imminent PO and no inquiry has happened, the mobile device may wake up early enough for frame-level synchronization at 1014 and may receive a paging indicator during the PO at 1016. At 1010, after receiving the paging indicator at 1016, or if the mobile device determines at 1008 that the time since the last inquiry is greater than the threshold, then the mobile device may send a page inquiry and receive a page indicator. At 1012, the next PO may be updated or determined. At 1018, after updating or determining the next PO at 1012, the mobile device may determine whether the page indicator indicates a page. If the page indicator indicates a page, then at 1020 the mobile device may perform the connection procedure and receive page message data. After receiving the page message data at 1020, if at 1018 the page indicator indicates no page, or if the mobile device determines at 1008 that the time elapsed since the last inquiry is not greater than the threshold then at 1022 the mobile device may return to deep sleep.

Referring to FIGS. 9 and 10, the check for the condition that last time elapsed since the last page inquiry is greater than a threshold (e.g., blocks 908 and 1008) may prevent the mobile device from inquiring for a page too often if the wake-up cycle of the mobile device are much shorter than paging requirements (e.g., due to other tasks). If page inquiry is disabled, the operations in FIG. 10 may degenerates to a conventional paging scheme, with the potential enhancement that the next PO could be adaptive.

Referring to FIG. 10, updating/determining the next PO (e.g., block 1012), during a current PO may according to fixed scheme or a dynamic scheme. According to a fixed scheme, a paging cycle and rule for updating next PO may be known on both sides (e.g. based on a configuration), for example, Z number of frames in the future. No additional coordination may be needed between both sides to establish this. According to a dynamic scheme, the time to a next PO may be adapted (e.g., based on a heuristic algorithm) and may be determined and updated to both sides. In addition, it is also possible to apply the operations shown in FIG. 9 if a maximum tolerable latency is made adaptive.

The on-demand paging techniques presented herein may have several benefits. For example, the techniques may eliminate a wakeup cycle. Each wake-up energy overhead may be significant, thus, eliminating a wakeup cycle may result in considerable energy savings. For scenarios with MT data scenario, which could be the majority of page detections, the number of wake-ups may be reduced from two wakeups to one wakeup. In addition, as described above, a mobile device performing on-demand paging may not need frame-level or beyond (e.g. hyper-frame) synchronization. In LTE, SFN is contained in the physical broadcast channel (PBCH) and a grander time scale frame number may be the system information block (SIB)—additional energy and time may be taken to acquire them.

The entity that potentially buffers the page message and provides the paging indicator to the device is referred to as the "buffering entity." In a cellular topology, the buffering entity may be the base station; however the techniques described herein are applicable to any radio access network (RAN) topology where a message could be buffered in a the base station or a different entity and another entity may be notified to retrieve the message, for example, among nodes in a mesh network. In a wireless local area network (WLAN) context, the buffering entity may be the access point (AP).

In the cellular topology, the functionalities are further divided among base station and mobile management entity (MME). Because the network may not know the precise proximity of the mobile device; but may know the tracking area (TA), the network may keep (e.g., buffer) the actual page message at the MME, while letting the nodes in the TA send the page indicator. Once the mobile device detects the page indicator and connects to the network (e.g., via the connection procedure), the network may forward the buffered page message from the MME to the actual serving node.

Operations from the buffering entities perspective are shown in FIG. 6. A message may arrive at the buffering entity (e.g., BS, AP, MME, or other entity). During a prescribed "page window", upon reception of a page inquiry from the mobile device, the buffering entity may respond with a paging indicator. If a PO fallback is needed, the buffering entity may send the paging indicator on the PO. When the mobile device acknowledges receiving the page indicator and there is a page message, the buffering entity sends the page message to the device. Once the page message is delivered to the mobile device, the buffering entity may discard the received message. If the mobile device misses the page window, the buffering entity may respond with a paging indicator when inquiry comes, until some system level time-out for dropping the page message, in a manner similar to a legacy device that skips its POs.

Example Registration Procedure

Enabling and implementing on-demand paging as described herein may involve interactions between various network entities. For example, in a cellular context, the network entities may be a UE, base station (e.g., an eNB), and MME.

In some cases, to receive paging, a UE (e.g., the mobile device) may register (e.g., perform a tracking area update (TAU) in IDLE state) by performing a registration procedure. For example, for LTE, the UE may perform a registration procedure if a current TA or cell ID advertised in SIB1 by the serving cell is not in the list of TAs and cell IDs that the UE has received from the network in the last TAU or if the periodic TAU timer expires. The UE may also perform a registration procedure if other radio access technologies (RATs) become available or if connectivity is established to another RAT (e.g., a WLAN or mmW RAT).

For LTE paging and registration, a UE may register (perform a TAU in IDLE state) in the following scenarios: if the current TA or cell ID advertised in SIB1 by the serving cell is not in the list of TAs and cell IDs that the UE has received from the network in the last TAU or if the periodic TAU timer expires. A UE in IDLE state is paged in all cells of the Tracking Areas (TAs) in which it is currently registered. The UE may be registered in multiple TAs and based on a Tracking Area List received in the TAU Update Accept message.

Figure 11:
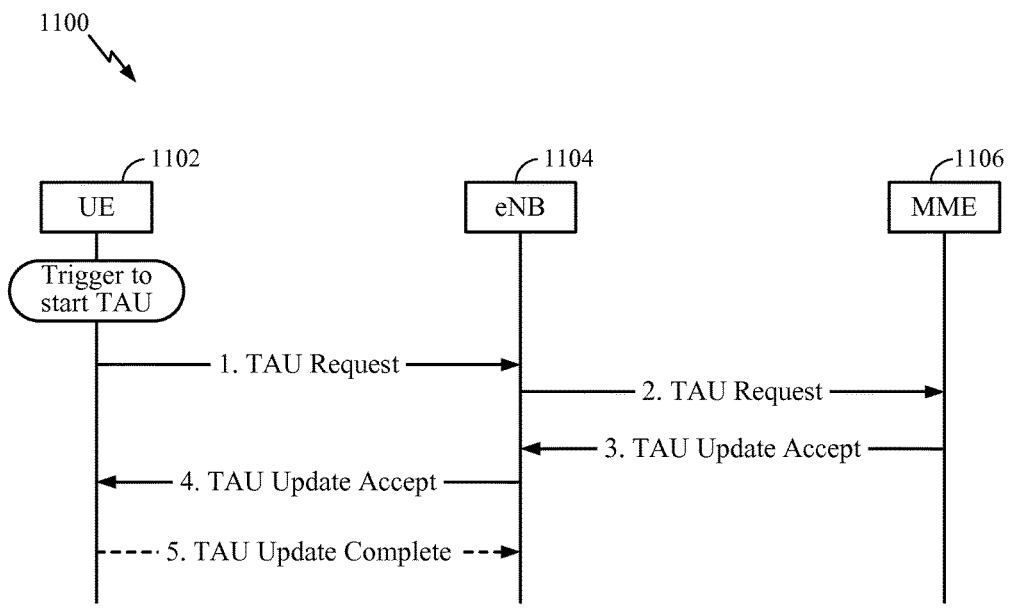
FIG. 11 is an example call flow diagram illustrating a long term evolution (LTE) registration procedure for on-demand paging, in accordance with certain aspects of the present disclosure.

FIG. 11 is an example call flow 1100 illustrating an LTE registration procedure for on-demand paging, in accordance with certain aspects of the present disclosure. A UE in idle state may be paged in all cells of the TAs in which the UE is currently registered. The UE may be registered in multiple TAs and based on a track area list received in a TAU update accept message. As shown in FIG. 11, occurrence of some trigger (e.g., one of the reasons discussed above for performing a registration procedure), may cause the UE 1102 to start a TAU.

At 1, the UE 1102 may send a TAU Request message (e.g., a registration message) to the eNB 1104. To enable on-demand paging, the TAU Request message may be enhanced to include additional information. For example, the registration message may include on-demand indication information (e.g., indicating whether the UE will be paged directly or query for a page) and/or synchronization level information (e.g., to indicate the level of synchronization of the UE to determine how long the page needs to be buffered). In some cases, the synchronization level and on-demand indication information may be part of the UE capabilities. At 2, the eNB 1104 may forward the TAU Request message to the MME 1106. At 3, the MME 1106 may determine, for example based on the TAU Request and connections, whether to perform on-demand paging or normal broadcast paging for the UE 1102. In addition, for on-demand paging, the MME 1106 may determine the time window in which the UE may request the page when the UE wakes up to determine if there is a page present. The MME 1106 may send a TAU Update Accept message to the eNB 1104. At 4, the eNB 1104 may forward the TAU Update Accept message to the UE 1102 with the additional indication of whether to perform on-demand paging or to receive normal broadcast paging and, for on-demand paging, the time window in which the UE may request the page when it wakes up to determine if there is a page present. At 5, the UE 1102 may acknowledge the TAU Update Accept by returning a TAU Complete message to the eNB 1104 (which the eNB 1104 may forward to the MME 1106).

Example UE Capabilities Procedure

According to certain aspects, the UE can provide its on-demand indication and synchronization level information as part of the UE capabilities procedures as an alternative to providing that information in the TAU request (e.g., step 1 in FIG. 11).

In some cases, the MME may store the UE radio capabilities that are forwarded by the eNB 1204 in an S1-AP UE CAPABILITY INFO INDICATION message. For example, the eNB 1204 may acquire the UE capabilities after a handover completion. When the UE 1202 establishes a connection, the MME may include the last received UE radio capabilities as part of the S1-AP: INITIAL CONTEXT SETUP REQUEST message sent to the eNB 1204. During handover preparation, the source RAN node may transfer both the UE source RAT capabilities and the target RAT capabilities to the target RAN node, in order to minimize interruptions.

Figure 12:
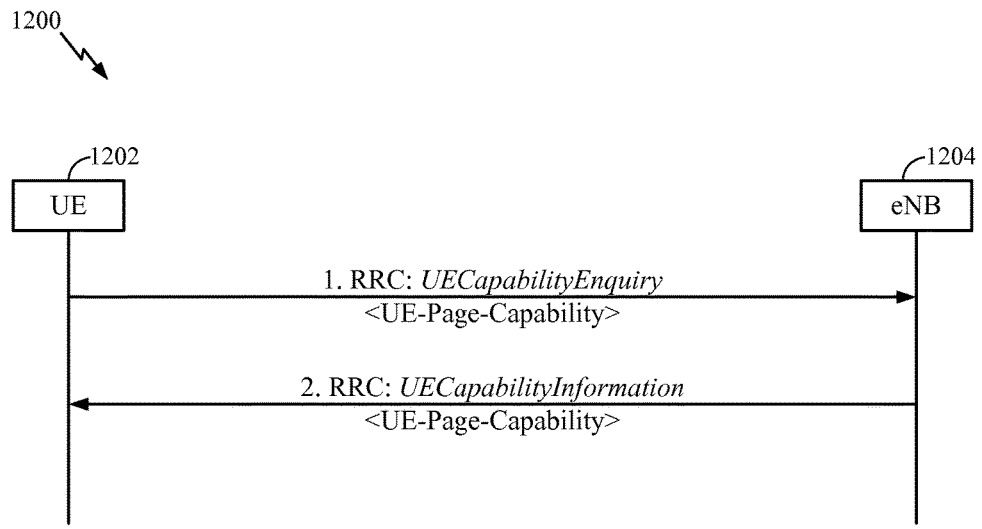
FIG. 12 is an example call flow diagram illustrating a user equipment (UE) capabilities procedure for on-demand paging, in accordance with certain aspects of the present disclosure.

FIG. 12 is an example call flow illustrating the radio resource control (RRC) UE capability handling procedure 1200, initiated by the eNB 1204 to the UE 1202, in accordance with certain aspects of the present disclosure.

As illustrated in FIG. 12, to enable the UE to provide its paging information as part of the UE capability handling procedure 1200, at 1, the eNB 1204 may send the UE 1202 a UECapabilityEnquiry message indicating a request to include paging capabilities. At 2, upon reception of the UECapabilityEnquiry message from the eNB 1204, the UE 1202 sends the eNB 1204 a UECapabilityInformation message. According to certain aspects, if the UECapabilityEnquiry includes a UE-Page-Capability request, then the UE 1202 responds with includes the UE-Page-Capability information element (IE) in the UECapabilityInformation message. The UE-Page-Capability IE may include fields indicating the on-demand indication and synchronization level information.

Example Paging Procedure

A UE in IDLE state may be paged in all cells of the TAs and cell IDs in which the UE is currently registered. The UE may be registered in multiple TAs and cell IDs based on a TA and Cell ID List received in the TAU Update Accept message (e.g., at step 3 in FIG. 11). The Tracking Area Identity may be constructed from the Mobile Country Code (MCC), Mobile Network Code (MNC) and Tracking Area Code (TAC). In some cases, all the TAs and Cell IDs in a TA List to which the UE is registered may be served by the same serving MME.

Figure 13:
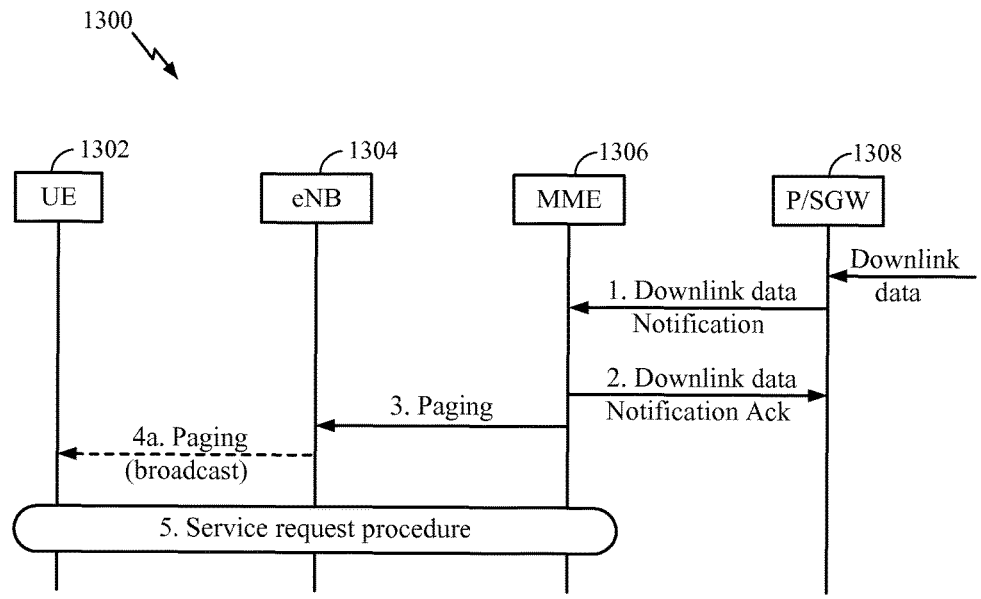
FIG. 13 is an example call flow diagram illustrating a paging and service request procedure, in accordance with certain aspects of the present disclosure.

FIG. 13 is an example call flow 1300 illustrating a paging and service request procedure, in accordance with certain aspects of the present disclosure. As illustrated in FIG. 13, when the packet/serving gateway (P/SGW) 1308 receives downlink data, the P/SGW may send a Downlink Data Notification message to the MME 1306. U-plane paging may be triggered in the MME 1306 when the MME 1306 receives the Downlink Data Notification message. The Downlink Data Notification may include the allocation/retention priority (ARP) and evolved packet system (EPS) Bearer ID for the data that has triggered the page. The MME 1306 may use the EPS bearer context information identified by EPS bearer ID received in Downlink Data Notification message in order to control the paging based on operator policy, such as: paging retransmission strategies and determining whether to send the paging message to the eNB 1304 during certain MME high load conditions.

At 2, the MME 1306 may send a Downlink Data Notification Acknowledgment (ACK) message to the P/SGW 1308 to acknowledge receipt of the Downlink Data Notification message. At 3, the MME 1306 may send a paging message to the eNB 1304. In addition to identifying the UE 1302, the paging message may indicate whether the UE 1302 will request the page (on-demand page) or if the page message needs to be broadcast and, in the case of on-demand page, how long the eNB 1304 needs to buffer the page message. At 4a, the eNB 1304 may forward (e.g., broadcast) the paging message to the UE 1302. At 5, a service request procedure may be performed between the UE 1302, eNB 1304, and MME 1306.

Figure 14:
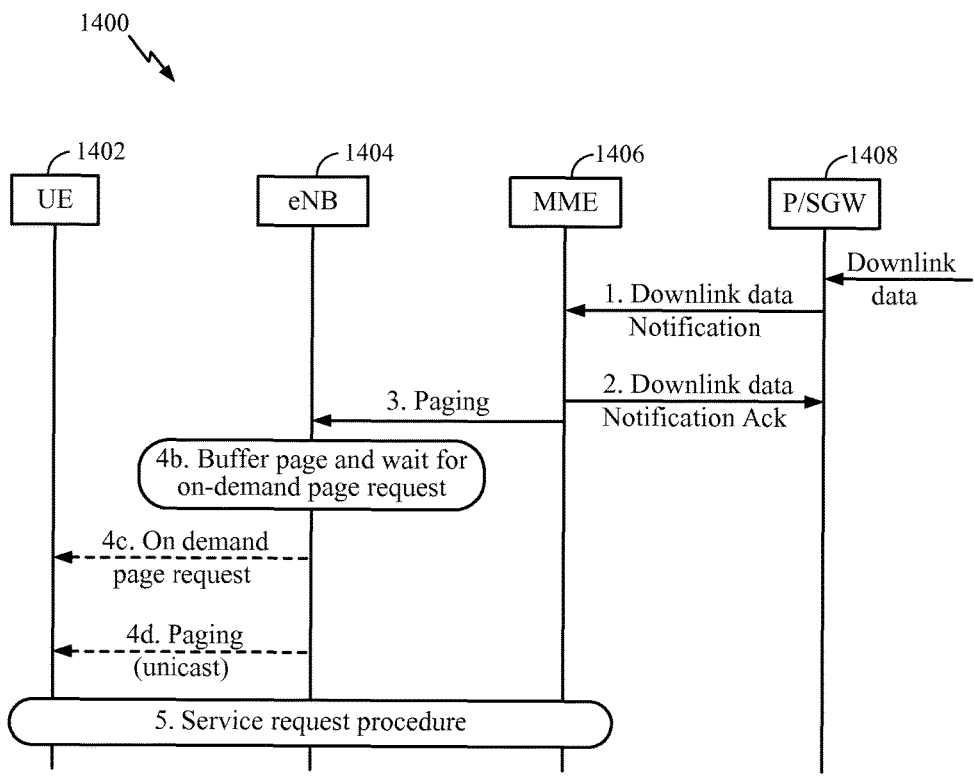
FIG. 14 is another example call flow diagram illustrating a paging and service request procedure for on-demand paging, in accordance with certain aspects of the present disclosure.

FIG. 14 is an example call flow 1400 illustrating a paging and service request procedure for on-demand paging, in accordance with certain aspects of the present disclosure.

At 1, the U-plane paging may be triggered in the MME 1406 when the MME 1406 receives the Downlink Data Notification message from the P/SGW 1408. The Downlink Data Notification may include the ARP and EPS Bearer ID for the data that triggered the page. The MME 1406 may use the EPS bearer context information identified by EPS bearer ID received in Downlink Data Notification message in order to control the paging based on operator policy such as: paging retransmission strategies, determining whether to send the Paging message to the eNB 1404 during certain MME high load conditions, and paging optimizations for traffic arriving on the packet data network (PDN) connection used for Local IP Access without mobility. According to certain aspects, in order to identify the service at the MME 1406, the Downlink Data Notification message sent from the P/SGW 1408 to the MME 1406 may include information, such as information indicating the service for which the UE 1402 is being paged. For example, the P/SGW 1408 may use Deep Packet Inspection (DPI) to determine the identity of the service and forward this information to the MME 1406 in the Downlink Data Notification message.

At 2, the MME 1406 may respond to the Downlink Data Notification message from the P/SGW 1408 with the Downlink Data Notification Ack message. At 3, the MME 1406 may page the UE 1402 by sending the paging message based on the existing TAI list for the UE 1402 to the eNB 1404. According to certain aspects, in addition to identifying the UE 1402, the paging message may be enhanced to include an on-demand page indication and buffering time for the UE 1402. At 4b, the eNB 1404, upon receiving the paging message, may determine whether to perform the normal broadcast page procedure shown in FIG. 13 (e.g., step 4a) or an on-demand page procedure.

For the normal broadcast procedure (step 4a in FIG. 13), the eNB 1404, upon receiving the paging message, pages the UE 1402 based on the information included in the paging message. Alternatively, for the on-demand page procedure, upon receiving the paging message, at 4b the eNB 1404 may buffer the paging message based on the buffering time specified in the paging message. At 4c, the UE 1402 may wake up and determine if it is in the paging window defined by its synchronization level and the SFN, and sends a request for the on-demand page. At 4d, in response to the on demand page request, the eNB 1404 may forward the on-demand page to the UE in unicast (or optionally broadcast). And at 5, a service request procedure may be performed between the UE 1402, eNB 1404, and MME 1406.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

For example, means for receiving, means acquiring, and/or means for obtaining may comprise a receiver (e.g., the receiver unit of transceiver(s) 254a through 254r) and/or an antenna(s) 252a through 252r of the access terminal 250 or the receiver (e.g., the receiver unit of transceiver(s) 222a through 222t) and/or antenna(s) 224a through 224t of access point 210 illustrated in FIG. 2 and/or the receiver 312 and antenna(s) 316 of the wireless device 302 illustrated in FIG. 3. Means for transmitting, means for sending, and/or means for providing may be a transmitter (e.g., the transmitter unit of transceiver(s) 254a through 254r) and/or an antenna(s) 252a through 252r of the access terminal 250 or the transmitter (e.g., the transmitter unit of transceiver(s) 222a through 222t) and/or antenna(s) 224a through 224t of access point 210 illustrated in FIG. 2 and/or the transmitter 310 and/or antenna(s) 316 of the wireless devices 302 illustrated in FIG. 3.

Means for acquiring, means for determining, means for sending, means for exiting, means for receiving, means for returning, means for performing, means for establishing, means for providing, means for maintaining, means for transmitting, means for buffering, and/or means for sending may comprise a processing system, which may include one or more processors, such as the RX data processor 260, the TX data processor 238, and/or the processor 270 of the access terminal 250 or the TX data processor 214, RX data processor 242, TX MIMO Processor 220, and/or the processor 230 of the access point 210 illustrated in FIG. 2 and/or the processor 304 of the wireless device 302 illustrated in FIG. 3.

According to certain aspects, such means may be implemented by processing systems configured to perform the corresponding functions by implementing various algorithms (e.g., in hardware or by executing software instructions) described above for providing an immediate response indication in a PHY header.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for receiving a paging message by a mobile device, comprising:
   determining a paging window that includes a paging occasion (PO) of a paging cycle and a duration that is at least one of: before or after the PO;
   acquiring symbol-level network timing information for synchronization to a network;
   determining, based on the symbol-level network timing information, that the mobile device is within the paging window; and
   performing an on-demand paging procedure in the paging window, wherein performing the on-demand paging procedure comprises:
     sending a message that indicates the mobile device is able to receive a paging indicator message or that requests a paging indicator message for the mobile device, wherein the paging indicator message indicates whether there is a paging message for the mobile device; and
     receiving the paging indicator message in response to the message.

2. The method of claim 1, wherein the paging indicator message is received via a physical downlink control channel (PDCCH) or physical downlink shared channel (PDSCH).

3. The method of claim 1, further comprising:
   exiting a deep sleep-state to acquire the network timing information; and
   returning to the deep sleep state if the paging indicator message indicates that there is no paging message for the mobile device.

4. The method of claim 3, wherein the exiting is in preparation for performing one or more tasks at the mobile device.

5. The method of claim 4, wherein:
   performing the one or more tasks comprises sending mobile originated (MO) data or control information; and
   the message is transmitted with the MO data or control information.

6. The method of claim 1, further comprising:
   performing a connection procedure with the network to receive the paging message if the paging indicator message indicates there is a paging message for the mobile device.

7. The method of claim 6, further comprising:
   receiving, with the paging indicator message, at least one of scheduling information for data associated with the paging message or data associated with the paging message.

8. The method of claim 1, wherein the message is sent with at least one of data or control information originating from the mobile device.

9. The method of claim 1, further comprising:
   providing capability information, wherein the capability information indicates whether paging indicator messages are to be sent in response to the message.

10. The method of claim 9, wherein the capability information is provided in a capabilities message.

11. The method of claim 9, wherein the capability information is provided in a registration message.

12. The method of claim 9, further comprising:
    providing, with the capability information, an indication of a tolerable latency for the paging messages to be buffered for the mobile device.

13. The method of claim 1, further comprising:
    receiving an indication from the network that paging indicator messages will be sent in response to the message.

14. The method of claim 1, wherein at least one of a periodicity or length of the paging window is dependent on a tolerable latency during which the paging message for the mobile device is held in a buffer at the network.

15. The method of claim 14, wherein the mobile device is configured to maintain a timer to ensure the message is sent within the tolerable latency.

16. The method of claim 1, wherein the mobile device is configured to determine a next paging window based on a current paging window.

17. The method of claim 1, wherein determining that the mobile device is within the paging window comprises determining that a threshold amount of time has passed since transmitting a last message.

18. The method of claim 1, wherein determining that the mobile device is within the paging window comprises:
    defining the paging window based on a worst case timing drift associated with a synchronization level of the mobile device and a time of the PO; and
    checking an internal timer to determine whether the mobile device is within the defined paging window.

19. The method of claim 1, further comprising:
    determining a time of occurrence of one of the POs after determining the paging cycle;
    entering a deep sleep state; and
    exiting the deep sleep state after a duration targeting the determined time of occurrence of the PO to acquire the symbol-level network timing information.

20. A method for paging a mobile device by a base station (BS), comprising:
    within a paging window during which an on-demand paging procedure is performed, receiving a message from the mobile device that indicates the mobile device is able to receive a paging indicator message or that requests a paging indicator message for the mobile device, wherein the paging window includes a paging occasion (PO) of a paging cycle and a duration that is at least one of: before or after the PO; and in response to the message, providing a paging indicator message to the mobile device within the paging window, wherein the paging indicator message indicates whether there is a paging message for the mobile device.

21. The method of claim 20, wherein the message is received with data originating from the mobile device.

22. The method of claim 20, further comprising:
receiving a paging message from a network node for the mobile device; and
buffering the paging message for a threshold duration or until the message is received from the mobile device.

23. The method of claim 22, wherein the threshold duration is indicated in the paging message.

24. The method of claim 22, wherein the threshold duration is configured by an operation, administrative, and maintenance (OAM) function.

25. The method of claim 22, wherein the threshold duration is indicated in capability information.

26. The method of claim 20, further comprising:
determining the mobile device is to receive paging messages in response to the message.

27. The method of claim 26, wherein the determination is based on an indication in the paging message.

28. The method of claim 26,
wherein the determination is made based on an indication in capability information received from the mobile device.

29. The method of claim 28, wherein the capability information is received in a capabilities message.

30. The method of claim 28, wherein the capability information is received in a registration message.

31. The method of claim 20, further comprising:
sending an indication to the mobile device that paging indicator messages will be sent on-demand in response to the message.

32. The method of claim 20, wherein the paging indicator message is sent after a fixed delay relative to a time when the message is received.

33. A method by a network node, comprising:
sending a paging message to a base station to be delivered to a mobile device within a paging window, wherein the paging window includes a paging occasion (PO) of a paging cycle and a duration that is at least one of: before or after the PO; and
providing an indication to the base station that an on-demand paging procedure is to be performed for delivering the paging message to the mobile device, wherein performing the on-demand paging procedure comprises:
delivering a paging indicator message to the mobile device in response to a message from the mobile device within the paging window that indicates the mobile device is able to receive a paging indicator message or that requests a paging indicator message for the mobile device.

34. The method of claim 33, further comprising:
providing an indication of a threshold duration the paging message is to be buffered by the base station.

35. An apparatus for receiving a paging message, comprising:
means for determining a paging window that includes a paging occasion (PO) and a duration that is at least one of: before or after the PO;
means for acquiring symbol-level network timing information for synchronization to a network;
means for determining, based on the symbol-level network timing information, that the apparatus is within the paging window; and
means for performing an on-demand paging procedure in the paging window, wherein means performing the on-demand paging procedure comprises:
means for sending a message that indicates the apparatus is able to receive a paging indicator message or that requests a paging indicator message for the apparatus; and
means for receiving the paging indicator message in response to the message.

36. The apparatus of claim 35, further comprising:
means for exiting a deep sleep state to acquire the network timing information; and
means for returning to the deep sleep state if the paging indicator indicates that there is no paging message for the apparatus.

37. The apparatus of claim 35, further comprising:
means for receiving an indication from the network that paging indicator messages will be sent in response to the message.

38. The apparatus of claim 35, wherein:
at least one of: a periodicity or length of the paging window is dependent on a tolerable latency during which the paging message for the apparatus is held in a buffer at the network, and
the apparatus further comprises means for maintaining a timer to ensure the paging indicator message is sent within the tolerable latency.

39. The apparatus of claim 35, wherein the apparatus further comprises means for determining a next paging window based on a current paging window.

40. The apparatus of claim 35, wherein means for determining that the apparatus is within a paging window comprises means for determining that a threshold amount of time has passed since transmitting a last message.

41. An apparatus for paging a mobile device, comprising:
means for receiving a message from the mobile device, within a paging window during which an on-demand paging procedure is performed, that indicates the mobile device is able to receive a paging indicator message or that requests a paging indicator message for the mobile device, wherein the paging window includes a paging occasion (PO) of a paging cycle and a duration that is at least one of: before or after the PO; and
means for providing a paging indicator message within the paging window, in response to the message, wherein the paging indicator message indicates whether there is a paging message for the mobile device.

42. The apparatus of claim 41, further comprising:
means for receiving a paging message from a network node for the mobile device; and
means for buffering the paging message for a threshold duration or until the message is received from the mobile device.

43. The apparatus of claim 41, further comprising:
means for determining paging indicator messages are to be provided on-demand in response to the message, wherein the determination is based on an indication in the paging message.

44. The apparatus of claim 41, further comprising:
sending an indication to the mobile device that paging messages will be sent on-demand in response to the message.

45. An apparatus, comprising:
  means for sending a paging message to a base station to be delivered to a mobile device within a paging window that includes a paging occasion (PO) of a paging cycle and a duration that is at least one of: before or after the PO; and
  means for providing an indication to the base station that an on-demand paging procedure is to be performed for delivering the paging message to the mobile, wherein performing the on-demand paging procedure comprises:
    delivering a paging indicator message to the mobile device in response to a message from the mobile device within the paging window that indicates the mobile device is able to receive a paging indicator message or that requests a paging indicator message for the mobile device.

46. An apparatus for receiving a paging message, comprising:
  a receiver;
  a transmitter; and
  at least one processor coupled with a memory and configured to:
    determine a paging window that includes a paging occasion (PO) and a duration that is at least one of: before or after the PO;
    acquire symbol-level network timing information for synchronization to a network;
    determine, based on the symbol-level network timing information that the apparatus is within the paging window; and
    perform an on-demand paging procedure in the paging window, wherein performing the on-demand paging procedure comprises:
      sending, via the transmitter, a message that indicates the apparatus is able to receive a paging indicator message or that requests a paging indicator message for the apparatus; and
      receiving, via the receiver, the paging indicator message in response to the message.

47. The apparatus of claim 46, wherein the at least one processor is further configured to determine a next paging window based on a current paging window.

48. The apparatus of claim 46, wherein the least one processor is configured to determine that the apparatus is within the paging window by determining that a threshold amount of time has passed since transmitting a last message.

49. An apparatus for paging a mobile device, comprising:
  a receiver configured to receive, within a paging window during which an on-demand paging procedure is performed, a message from the mobile device that indicates the mobile device is able to receive a paging indicator message or that requests a paging indicator message for the mobile device, wherein the paging window includes a paging occasion (PO) of a paging cycle and a duration that is at least one of: before or after the PO; and
  at least one processor coupled with a memory and configured to provide a paging indicator message, within the paging window, that indicates whether there is a paging message for the mobile device.

50. The apparatus of claim 49, further comprising:
  a transmitter configured to send an indication to the mobile device that paging indicator messages will be sent on-demand in response to the message.

51. An apparatus, comprising:
  a transmitter configured to send a paging message to a base station to be delivered to a mobile device within a paging window that includes a paging occasion (PO) of a paging cycle and a duration that is at least one of: before or after the PO; and
  at least one processor coupled with a memory and configured to provide an indication to the base station that an on-demand paging procedure is to be performed for delivering the paging message to the mobile, wherein performing the on-demand paging procedure comprises:
    delivering a paging indicator message to the mobile device in response to a message from the mobile device within the paging window that indicates the mobile device is able to receive a paging indicator message or that requests a paging indicator message for the mobile device.

52. A non-transitory computer readable medium having computer executable code stored thereon for:
  determining a paging window that includes a paging occasion (PO) and a duration that is at least one of: immediately or after the PO;
  acquiring symbol-level network timing information for synchronization to a network;
  determining, based on the symbol-level network timing information, that a mobile device is within the paging window; and
  performing an on-demand paging procedure in the paging window, where performing the on-demand paging procedure comprises:
    sending a message that indicates the mobile device is able to receive a paging indicator message or that requests a paging indicator message for the mobile device, wherein the paging indicator message indicates whether there is a paging message for the mobile device; and
    receiving the paging indicator message in response to the message.

53. A non-transitory computer readable medium having computer executable code stored thereon for:
  within a paging window during which an on-demand paging procedure is performed, receiving a message from a mobile device that indicates the mobile device is able to receive a paging indicator message or that requests a paging indicator message for the mobile device, wherein the paging window includes a paging occasion (PO) of a paging cycle and a duration that is at least one of: before or after the PO; and
  in response to the message, providing a paging indicator message to the mobile device within the paging window, wherein the paging indicator message indicates whether there is a paging message for the mobile device.

54. A non-transitory computer readable medium having computer executable code stored thereon for:
  sending a paging message to a base station to be delivered to a mobile device within a paging window that includes a paging occasion (PO) of a paging cycle and a duration that is at least one of: before or after the PO; and
  providing an indication to the base station that an on-demand paging procedure is to be performed for delivering the paging message to the mobile device, wherein performing the on-demand paging procedure comprises:
    delivering a paging indicator message to the mobile device in response to a message from the mobile device within the paging window that indicates the mobile device is able to receive a paging indicator message or that requests a paging indicator message for the mobile device.

* * * * *